UNITED STATES PATENT OFFICE.

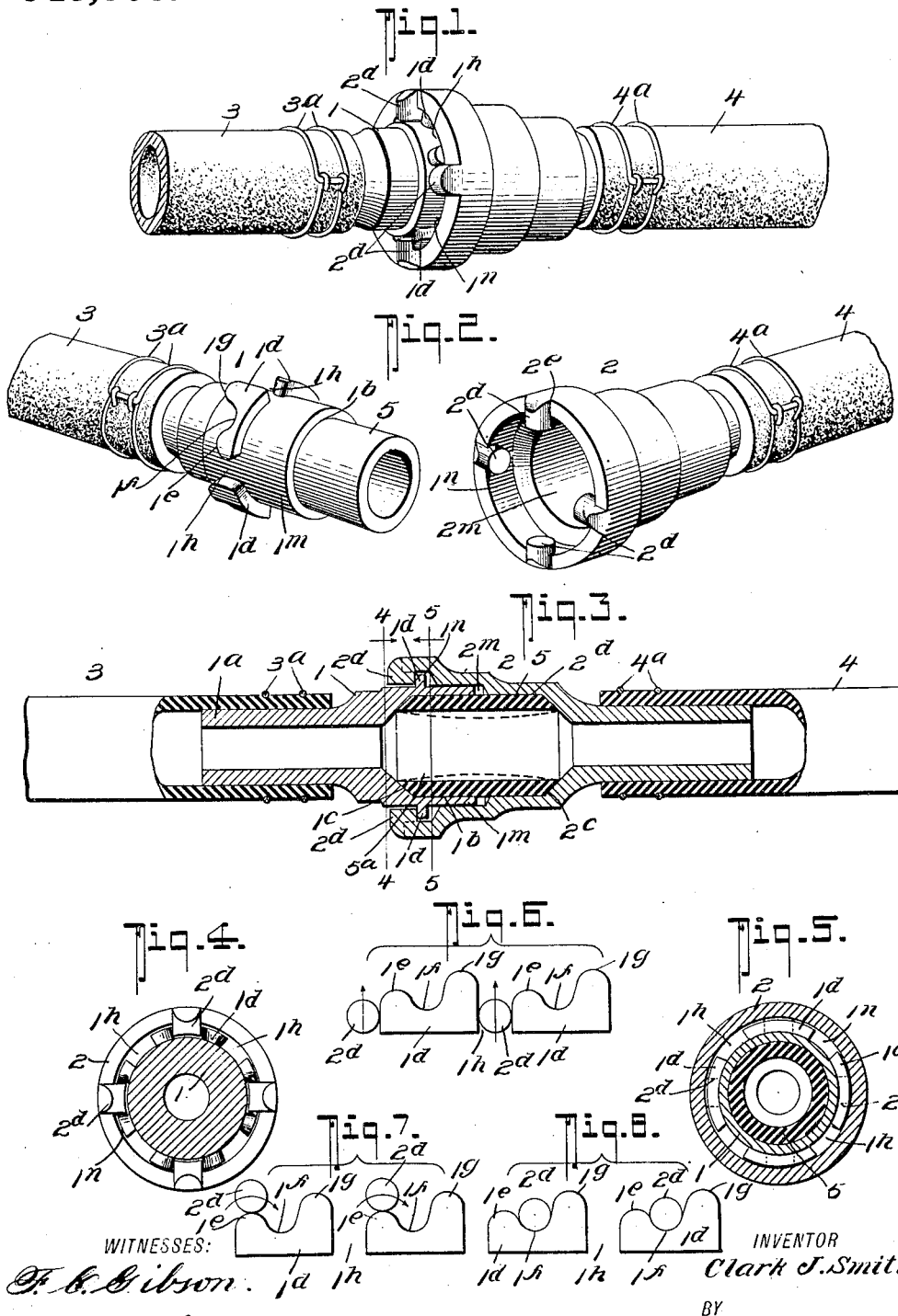

CLARK J. SMITH, OF OTTUMWA, IOWA, ASSIGNOR TO HARDSOCG WONDER DRILL CO., OF OTTUMWA, IOWA, INCORPORATED.

PIPE-COUPLING.

943,900.

Specification of Letters Patent. Patented Dec. 21, 1909.

Application filed January 2, 1907. Serial No. 350,515.

*To all whom it may concern:*

Be it known that I, CLARK J. SMITH, residing at Ottumwa, in the county of Wapello and State of Iowa, have invented certain new and useful Improvements in Pipe-Couplings, of which the following is a specification.

My invention relates to certain new and useful improvements in pipe couplings, and it particularly has for its object to provide a coupling that is particularly adapted for use as a train pipe or hose pipe coupling which is of such construction and design as to be easily and cheaply manufactured and which will readily and effectively serve its intended purposes.

Another object of my invention is to provide a coupling which can be very quickly coupled and uncoupled, and which also consists of a minimum number of parts.

Generically my invention comprises a pair of coupling heads having means for coöperatively locking the parts together, said locking means being of a particular design to enable a quick interlocking of the parts to lock the sections together, and also to enable a quick unlocking of the parts whenever desired. The coupling also includes a resilient tubular ferrule which not alone serves a washer or packing function, but also serves the function of a spring to hold the respective sections of the coupling tightly in their locked position.

Again the invention resides in certain novel construction, combination and arrangement of parts, all of which will be first described in detail, and then be specifically pointed out in the appended claims, reference being had to the accompanying drawing, in which:—

Figure 1, is a perspective view of my invention in use, the parts being coupled. Fig. 2, is a similar view, the parts being uncoupled. Fig. 3, is a central, vertical longitudinal section of the coupling in its locked position. Fig. 4, is a cross section on the line 4—4 of Fig. 3. Fig. 5, is a cross section on the line 5—5 of Fig. 3, the parts being in their unlocked position. Fig. 6, is a diagrammatic view showing the position of the interlocking lugs when the sections are first engaged. Fig. 7, is a similar view showing the position of the lugs when moved halfway toward the unlocked position. Fig. 8, is another diagrammatic view of the lugs when the sections are locked.

Referring now to the accompanying drawings in which like letters and numbers of reference indicate like parts in all of the figures, 1 and 2 designate respectively the male and female sections of the coupling. The section 1 has the usual tubular neck $1^a$ to which the hose pipe 3 may be secured by a wire clamp $3^a$ as shown. The section 1, is provided with a bore $1^b$ which merges with a slightly conically formed seat $1^c$ and in which the ferrule 5 is held, the ferrule 5 being simply a short section of rubber tube. The ferrule 5 has its end $5^a$ abutting the seat $1^c$, as shown. On its outer surface and spaced inwardly some distance from the end of the member 1 is a series of lugs $1^d$ which are of a peculiar construction and form one of the essential parts of my invention. The lugs $1^d$, it will be noticed, consist of a curved portion $1^e$ which merges with the curved seat $1^f$ that in turn merges with a further curved portion $1^g$ which projects beyond the portion $1^e$ to form a stop for the lugs of the other section 2, hereinafter again referred to. Each of the lugs $1^d$ is spaced from the other by a channel $1^h$ of a width slightly greater than that of the lugs $2^d$ carried by the coupling section 2. The section 2 has the usual couple to which the pipe 4 is secured similarly to the pipe 3, by a wire clamp $4^a$, as shown.

The coupling section 2 has a bore $2^d$ of corresponding diameter to the bore $1^b$ of the section 1 and the bore $2^d$ like the section 1 terminates in a conical seat $2^c$ to receive the ferrule 5, hereinbefore referred to. The section 2 is further provided with a slightly larger bore $2^m$ which merges with the bore $2^d$ and which is of such diameter as to receive the projecting end $1^m$ of the section 1 and at its outer end the section 2 is provided with a further bore $1^n$ of a diameter slightly greater than that of the outer surface of the lugs $1^d$ so that the lugs $1^d$ will enter the bore $1^n$ when the parts are locked. The section 2 carries a plurality of lugs $2^d$, one for each lug $1^d$, which lugs project from the end face of the section 2 as at $2^e$ and inwardly toward the central axis, a distance great enough to bring the adjacent faces of the lugs 1ᵈ a distance apart only great enough to permit passage of the projecting face 1ᵐ of the section 1 to pass therebetween. The lugs 2ᵈ are curved in cross section to correspond with the curvature of the seat 1ᶠ, the curvature of the seat 1ᶠ being of a radius equal to that of the projection 1ᵉ, and the projection 1ᵈ, as indicated in the diagrammatic figures of the drawings.

In joining the two sections of the coupling the parts are assembled as shown in Fig. 1, the lugs 2ᵈ being in the grooves 1ʰ and the ends of the ferrule 5 abutting its respective seats of the coupling members. It is then only necessary to turn the parts slightly from the position diagrammatically shown in Fig. 6, which is the initial position, to that shown in Fig. 7, when the lugs 2ᵈ will ride up out the projections 1ᵉ, this amount of turn being only through the arc of a circle equal to the distance between the center of the grooves 1ʰ and the center of curvature of the projections 1ᵉ. This will cause the coupling members to draw together against the counteracting tension of the ferrule 5 and upon moving the sections farther to the position shown in Fig. 8, the lugs 2ᵈ will enter the seats 1ᶠ and will be forced tightly into the same by the resiliency of the ferrule 5, thus the ferrule serves not only a washer function to render the joint water tight but a spring function to hold the parts locked. To unlock the section, it is only necessary to turn the sections in a reverse direction to the locking direction, when the lugs 2ᵈ will again come into alinement with the grooves 1ʰ and the sections may be pulled apart. By reason of the projections 1ᵍ being greater than the projections 1ᵉ they form locking stops against which the lugs 2ᵈ may abut whenever the sections are moved into either their locked or unlocked position.

From the foregoing description taken in connection with the accompanying drawings, it is thought the complete construction, operation and numerous advantages of my invention will be readily understood by those skilled in the art to which the invention appertains, and it furthermore will be seen that I have provided a quick-acting coupling of a very simple and effective construction that can be manufactured at a minimum expense.

What I claim is:—

1. In a pipe coupling of the character described, a male and a female section, each of said sections having a ferrule receiving bore terminating in a ferrule stop wall, an elastic ferrule held within said sections, said female section having a plurality of diametrically projecting lugs, said male sections having likewise a plurality of lugs spaced apart to permit passage of the lugs of the female section, said male section lugs each comprising a curved projection merging with a curved seat, and a second curved projection also merging with the curved seat substantially as shown and described.

2. In a pipe coupling of the character described, a male and a female section, each of said sections having a ferrule receiving bore terminating in a ferrule stop wall, an elastic ferrule held within said section, said female section having a plurality of diametrically projecting lugs, said male sections having likewise a plurality of lugs spaced apart to permit passage of the lugs of the female section, said male section lugs each comprising a curved projection merging with a curved seat, a second curved projection also merging with the curved seat, said second projection being greater than the first curved projection to form stops substantially as shown and described.

3. In a pipe coupling of the character described, a male and a female section, each of said sections having a ferrule receiving bore terminating in a conical ferrule stop wall with the portion of smallest diameter away from the mouth of the sections, an elastic ferrule held within said sections, said female section having a plurality of diametrically projecting lugs of cylindrical form, said male section having likewise a plurality of lugs spaced apart to permit passage of the lugs of the female section, said male section lugs each comprising a semi-circular curved projection merging with a semi-circular seat, which seat in turn merges with a second semi-circular projection, said second projection being greater than the first projection to form a stop, substantially as shown and described.

4. In a pipe coupling, a male and a female section, each of said sections having a ferrule receiving bore terminating in a conical ferrule stop wall with the portion of smallest diameter away from the mouth of said sections, an elastic ferrule held within said sections, said female section having a plurality of diametrically projecting lugs of cylindrical form and projecting inwardly from the inner surfaces of the sections, said male section having likewise a plurality of lugs on its outer surfaces, spaced apart to permit passage of the lugs of the female section, said male section lugs each comprising a semi-circular curved projection merging with a semi-circular seat, which seat in turn merges with a second semi-circular projection, said second projection being greater than the first projection to form a stop for the lugs of the female section substantially as shown and described.

5. A pipe coupling, a male and a female section, an elastic ferrule held within said sections, each of said sections having interlocking lugs, the lugs of one section being formed with seats for the lugs of the other section, and having curved cam like portions merging with said seats whereby the axial rotation of the sections will force the sections toward one another until the lugs of the one section engage the seat portion of the other section, and said flexible ferrule serving to force the sections away from each other to seat the lugs of the one section into the seat portion of the lugs of the other section, substantially as shown and described.

CLARK J. SMITH.

Witnesses:
 GERTRUDE ORR,
 F. H. HOSWELL.